Patented Dec. 15, 1953

2,662,891

UNITED STATES PATENT OFFICE 2,662,891

P-CHLOROPHENYL(2-PYRIDYL) (β-DI-METHYLAMINOETHOXY)METHANE

Nathan Sperber, Bronx, and Domenick Papa, Brooklyn, N. Y., and Erwin Schwenk, Montclair, N. J., assignors to Schering Corporation, Bloomfield, N. J., a corporation of New Jersey No Drawing. Application January 12, 1948, Serial No. 1,898

1 Claim. (Cl. 260—296)

The present invention relates to a new group of compounds of interesting and important physiological action. More specifically, the invention relates to dialkylamino alkyl ethers of pyridyl-substituted carbinols and methanethiols, having antihistaminic activity.

It is recognized that the liberation of histamine into the tissues which can be brought about by a multitude of agents or processes is primarily responsible for many of the allergic manifestations in man. It has been found that certain substances of closely related chemical configuration are effective in alleviating the symptoms of many allergic reactions. Although the substances prescribed at the present time represent a remarkable advance, they nevertheless exhibit many undesirable side effects, or so-called toxic reactions, among which may be mentioned drowsiness, dizziness, nausea, gastro-intestinal irritation and dryness of the mouth.

We have now found that dialkylamino alkyl ethers of the general formula

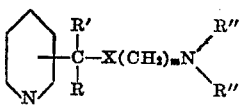

wherein R is an alkyl group containing not more than eight carbon atoms, a cycloalkyl, an aryl, an aralkyl or a heterocyclic group; R' is hydrogen or a lower alkyl group; X is oxygen or sulfur; m is an integer from two to four; and R'' are lower alkyl groups, —CH₂·CH₂·O·CH₂·CH₂— or —(CH₂)₅—; and in which the pyridyl ring may be substituted by methyl groups, possess extremely high activity against allergic manifestations.

Of particular interest are the compounds of the above formula in which the group R includes at least one chlorine or bromine atom, and especially those in which R is a chlorinated or brominated aryl or heterocyclic group.

In general, the compounds of the present invention may be prepared by the reaction of the appropriate carbinol or thiol with a dialkylaminoalkyl halide in the presence of a suitable condensing agent. For example, by reacting a pyridyl aryl carbinol with sodium powder in an inert organic solvent such as toluene, there is obtained the sodio derivative of the carbinol which can then be condensed with a dialkylaminoalkyl halide to secure the ether. As a specific example, phenyl (2-pyridyl) carbinol is added to a toluene suspension of an equivalent amount of finely powdered sodium. The reaction mixture is heated for several hours, treated with an equivalent amount of β-dimethylaminoethyl chloride, and after approximately ten hours, preferably overnight, on the steam bath the reaction product is decomposed. The aminoether is purified by solution in hydrochloric acid, which removes neutral and acidic products, and subsequent distillation of the oil obtained from the alkaline solution. In place of sodium metal, sodamide may be used as condensing agent. Other solvents such as benzene and xylene are satisfactory.

The requisite carbinols may be secured by the Grignard reaction of chloro or bromopyridine with alkyl, aralkyl, cycloalkyl, aryl and heterocyclic aldehydes in accordance with the following equation (Rec. trav. chim. 57 179 (1938)):

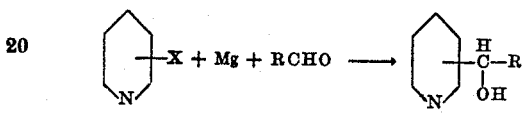

where X is bromine or chlorine, and R is an alkyl, cycloalkyl, aralkyl, aryl or heterocyclic group.

Pyridyl aryl carbinols may also be obtained by the condensation of picolinic acid with aromatic aldehydes and ketones, such as benzaldehyde, p-chlorobenzaldehyde and p-chloroacetophenone, by the method described in J. Chem. Soc. 809–812 (1939). We have found that it is advantageous to carry out the condensation in the presence of a solvent such as xylene, cymene, and the like, which is preferably selected to provide a boiling point corresponding to the desired reaction temperature.

The compounds of the present invention may be used in the form of their salts. Of particular interest are the hydrohalides, and especially the hydrochlorides, which may be prepared by any of the conventional methods.

The following specific examples will illustrate the invention more fully:

EXAMPLE I

*Phenyl(2-pyridyl) (β-dimethylaminoethoxy)-methane*

To sodamide prepared from 4.6 gm. of sodium in liquid ammonia, there is added 150 cc. of xylene followed by the addition of 35 gm. of phenyl(2-pyridyl)carbinol. The formation of the sodio derivative proceeds immediately with the liberation of ammonia. The reaction mixture is then refluxed for several hours with stirring, cooled in an ice-bath and 25 gm.

of freshly distilled β-dimethylaminoethyl chloride is added. The resulting mixture is heated on the steam bath for approximately 18 hours with stirring and then decomposed with 200 cc. of water. The xylene layer is separated and then extracted with 10% HCl. The acid solution is made alkaline with gaseous ammonia, the oil which separated is extracted with ether, dried and distilled. The pyridyl phenyl alkamine ether boils at 156-162° C./1.5 mm.

EXAMPLE II

*p-Chlorophenyl(2-pyridyl)(β-dimethylaminoethoxy)methane* p-Chlorophenyl(2-pyridyl)carbinol is made by heating five parts of p-chlorobenzaldehyde and one part of picolinic acid in a nitrogen atmosphere in 25 parts of boiling cymene for four to five hours. The resulting carbinol is isolated by solution in hydrochloric acid which separates the carbinol from other constituents of the reaction mixture and thereafter neutralizing the hydrochloric acid solution with ammonia and extracting with ether. Condensation of the carbinol with β-dimethylaminoethyl chloride by the procedure of Example I gives the pyridyl chlorophenyl alkamine ether as a yellow to orange-yellow liquid boiling at 156° C./0.5 mm.

This application is a continuation-in-part of our application Serial No. 718,624, filed December 26, 1946, now abandoned.

We claim:

p-Chlorophenyl(2-pyridyl)(β - dimethylaminoethoxy)methane.

NATHAN SPERBER.
DOMENICK PAPA.
ERWIN SCHWENK.

References Cited in the file of this patent

UNITED STATES PATENTS

| Number | Name | Date |
|---|---|---|
| 2,079,962 | Miescher et al. | May 11, 1937 |

OTHER REFERENCES

Journal of Pharmacology 83, 120-8.
Sidgwick, Organic Chemistry of Nitrogen, p. 522 (New Edition).
Jour. Chem. Soc., 809-12 (1939).
Chem. Abstracts 35, 4771[3] (1941).
Chemical Abstracts 30, 7576,[4,9] (1932).
Beilstein Vierte Auflage, vol. 9, page 121.